Aug. 4, 1942.  C. A. REIMSCHISSEL  2,291,919
DIE HEAD
Filed April 20, 1939  5 Sheets-Sheet 1

INVENTOR.
C. A. Reimschissel
BY
Hyatt Dowell
ATTORNEY.

Aug. 4, 1942.                C. A. REIMSCHISSEL                2,291,919
                                  DIE HEAD
                          Filed April 20, 1939          5 Sheets-Sheet 2

INVENTOR.
C. A. Reimschissel
BY
ATTORNEY.

Patented Aug. 4, 1942

2,291,919

UNITED STATES PATENT OFFICE 2,291,919

DIE HEAD

Charles A. Reimschissel, Waynesboro, Pa., assignor to Landis Machine Company, Waynesboro, Pa., a corporation of Pennsylvania

Application April 20, 1939, Serial No. 268,966

24 Claims. (Cl. 10—120.5)

This invention relates to die heads and more particularly to die heads used for cutting threads on bodies such as, for example, rods, bolts, screws, pipe or the like and using well known cutting elements, for example, in the form of tangentially disposed thread cutting chasers, which are ground upon their ends for sharpening. In die heads of this character, holders for the thread cutting elements are radially adjusted by suitable means, such as cams, coacting directly with the chaser holders of the heads to set them in position for cutting threads of the desired diametrical size. Also, an automatic release is employed for positively withdrawing or disengaging the thread cutting elements from the work upon the completion of the threading operation.

The construction which comprises the present invention is generally similar to that disclosed in Reimschissel Patent No. 2,082,757 wherein is disclosed a structure which is an improvement over that disclosed in Koontz Patent No. 1,456,805.

In the above mentioned patents, as in the present invention, chaser holders are employed of the general type disclosed in Reimschissel Patent No. 1,951,290. However, my present chaser holders are somewhat modified in that I now provide a more rigid and better wearing die head on account of the bearing surfaces between the slide portion of the chaser holders and the coacting slideways of the die head. In addition, I now provide gibs mounted on the face of the die head and coacting with the integral slide portion of the respective chaser holders to maintain the original precision of fit after the inevitable wearing of the head and slideway progresses.

Constructions heretofore in use, as illustrated by the above mentioned patents, possess certain characteristics that it has been found desirable to improve in order to provide a more satisfactory construction and one of longer life and a greater degree of efficiency. It is desirable to make a die head with the parts positively and rigidly coacting to cut threads extremely accurately and precisely. It has also been found desirable to improve the joint between the radial chaser holders and the die head, as the parts are subject to wear and involve difficulties in manufacture, due to the dove-tailed joint, which, in time, becomes less accurate and precise in operation.

It is an object of the invention to provide an improved die head of simpler, more durable and efficient construction having a wider usefulness in that it is not only capable of cutting threads of diametrical sizes but tapered threads as well and throughout the life of which the parts coact to provide a solid rugged construction for cutting threads positively and with precision.

Another object of the invention is to provide a die head in which the parts which are subjected to wear are readily accessible and may easily be replaced or reconditioned.

The complete die head is designed to minimize such wear since its parts are made from material which can be hardened and ground, thereby resulting in improved wearing qualities. Hardened and ground die heads heretofore have been expensive. However, the present head is inexpensive or economical to produce due to its simple construction and the use of few working parts.

It is a further object of the invention to provide a die head of wide, if not universal, application, having its interior protected from the entrance of foreign matter which would interfere with its operation and also constructed in a manner to eliminate any possibility of the entrapment of fluid which would tend to retard or otherwise interfere with the operation of the die head.

Among the things accomplished by the present invention is the provision of an improved radial latching mechanism with an annular circumferential bearing and a combined locking ring and adjusting nut. Heretofore, die heads of this type, such as for example, as shown in Reimschissel Patent No. 2,082,757, have employed a latching arrangement with a limited circumferential latching surface.

Another improvement is the manner of connecting the chaser holders with the die head, or in other words, their mounting; while a still further improvement utilized in a modification of the principal disclosure is the provision of a receding mechanism which facilitates the economical production of accurate tapered threads by the use of an internal axially movable work abutting member to actuate the chaser holders to allow them to open gradually sufficiently to cut the tapered threads and to trip the latching means to cause disengagement of the chasers from the work at the end of the threading operation.

A plurality of forms of radial latching arrangements are provided having enlarged bearing surfaces which may be reconditioned with simplicity after they have become worn. The joint between the chaser holders and the die head is improved by the provision of gibs adjustably mounted on the face of the die head and having a sliding engagement with the chaser holders so that precision of fit may be maintained after the head has been in use for a long period and objectionable wearing of the slides and slideways begins to occur.

By the above mentioned improvements, a die head of simpler construction is provided which is inherently longer lived and is more efficient and otherwise satisfactory.

Referring to the accompanying drawings:

Fig. 15, a longitudinal section illustrating parts in disassembled relation; and, Fig. 16, a fragmentary side elevation.

Referring to the drawings, the die head comprises a head body 20 in the form of a hollow shank and having an enlarged head at one end for carrying the chaser holders. The rear end of the hollow shank is provided with means by which the die head may be mounted onto a threading machine. This mounting element or adaptor includes an annular flange 21 carried by a central portion in the form of a short tubular member 22 which fits into enlarged bore 23 of the body 20. The adaptor is fastened to the body 20 by means of threaded studs 28 which seat in countersunk holes 29 in the tubular member 22. When the studs 28 are screwed in, they cause the parts to be drawn together in proper relation, with the end of the head body in contact with the radial portion of the adaptor, and fasten them together as a unit with no possibility of relative rotation therebetween.

Figure 1:
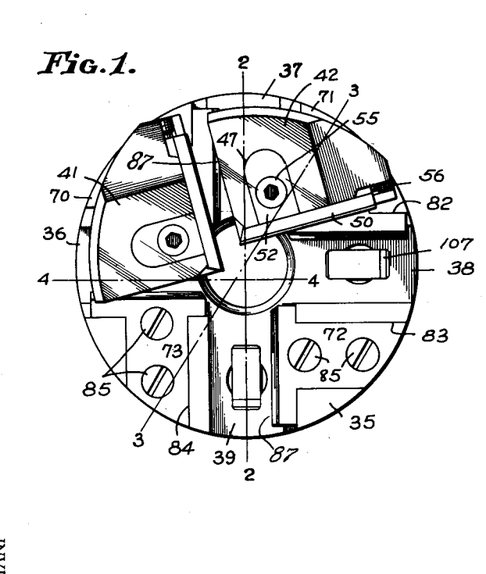
Fig. 1 is a face or end view of an improved die head in accordance with the present invention, two of the chaser holders being removed to reveal details of the chaser holder slideways in the face of the head.

In the enlarged forward portion 35 of head body 20 are chaser holder slideways 36, 37, 38, and 39 which coact, respectively, with slides on chaser holders 41, 42, and on two other similar chaser holders which have been removed to show the character of the bottom slide surfaces of slideways 38 and 39 (see Fig. 1). The die head herein shown utilizes four chaser holder assemblies. It will be obvious, however, that the die head could readily be adapted to employ fewer or more such assemblies.

As heretofore noted, the chaser holders that I prefer to employ are in general of the type illustrated in United States Patent No. 1,951,290. However, in the present instance, the slide portion of each of the holders is adapted to coact with gibbing means in the face of the die head. Since all four of the present holders are basically similar, only the construction of the assembly incorporating holder 42 will be discussed. Chaser holder 42 has therein a recess 45 which is adapted to receive tangential chaser 50, and another recess 47 in which is located chaser clamp 52. Clamp 52 coacts with clamping screws 55 to clamp the chaser 50 to holder 42 in the manner disclosed in the said Patent No. 1,951,290. In like manner, abutment or adjustment screw 56 is used to longitudinally position the chaser with respect to the holder. Thus, this much of the present holder assembly follows that of the said disclosure.

Figure 4:
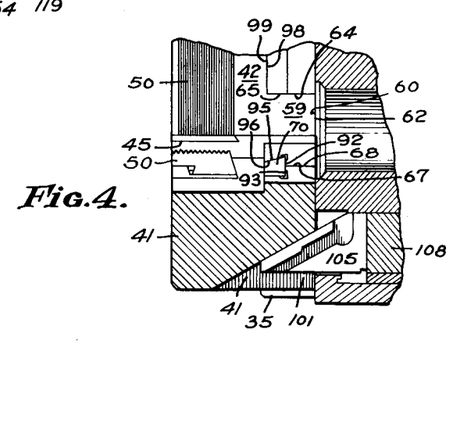
Fig. 4, a fragmentary section on the line 4—4 of Fig. 1 illustrating the manner in which the chaser holders are fastened to the die head.
Figure 5:
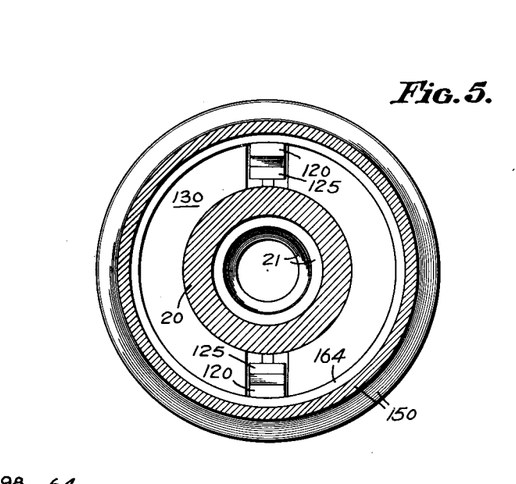
Fig. 5, a section on the line 5—5 of Fig. 2, and illustrating some of the details of the latching arrangement.

The present holder assembly utilizes a novel type of slide, the outline of which can be seen in Fig. 4. The base surface 60 of slide portion 59 of holder 42 is in intimate contact with the base surface 62 of slideway 37. Holder 42 also has its wall surface 64 in intimate contact with slideway surface 65; and holder slide surface 67 is in similar contact with slideway surface 68. Gib 70 is located within a recess 81 in the forward portion 35 of die head body 20. This gib is similar to gibs 71, 72, and 73, which gibs are designed to coact with the slides of the respective other holder assemblies employed in this die head. Gib recesses 81, 82, 83 and 84 are so proportioned that the top surface of each of the respective gibs resting therein does not extend beyond the face of the die head even when several thicknesses of shim stock (not shown) are inserted between the gib and the bottom of its respective die head recess. The various gibs are fastened to the die head body forward portion 35 by means of fillister head screws 85. The forward portion 87 of gib 70 has its bottom surface 92 in intimate contact with holder slide surface 93. A small clearance (not visible in the drawings) exists between gib surface 95 and holder slide surface 96. In addition, there is a very small clearance (also not visible) between holder surface 98 and the top surface 99 of die head body 20.

The above described construction has several inherent advantages over that which is disclosed in United States Patent No. 1,951,290. The bearing area of surfaces 64 and 65 is much larger and will better withstand longitudinal cutting thrust. Also, it is easier to machine these surfaces accurately than is the case with the dove-tailed design formerly employed. The use of the adjustable gibs makes it possible to hold the chaser holder in intimate contact with the bottom of its slideway. This wear compensating arrangement ensures an accurate chaser holder retaining means for a much longer peroid than was possible heretofore. It will be noted that wear will tend to be confined to the bottom surface 92 of the gib 70, since it is only during the initial thread starting period that the holders are being forced against the face of the die head—the subsequent nut action of the tangential chasers being of sufficient magnitude to tend to pull the holders away from the die head face. Since it is relatively inexpensive to refinish the gib surface, the present arrangement is superior to those employing dove-tails regardless of whether they are gibbed or not.

Camming means 100, located within a slot 101 in holder 41, cooperate with coacting means (a groove) on prong 105, which prong is similar to prongs 106, 107, and 108. These prongs are integral parts of closing ring 110, which is slidably mounted on the die head body 20. Forward movement of the closing ring 110 causes the chaser holders to be displaced radially inward by the camming contact provided by the respective closing ring prongs. Likewise, rearward movement of this ring causes the chaser holders to be displaced radially outward and thereby releases the chasers from the work. The manner in which the closing ring cooperates with the head body to so actuate the chaser holders is more fully described in my said prior die head disclosure in United States Patent No. 2,082,757.

Figure 2:
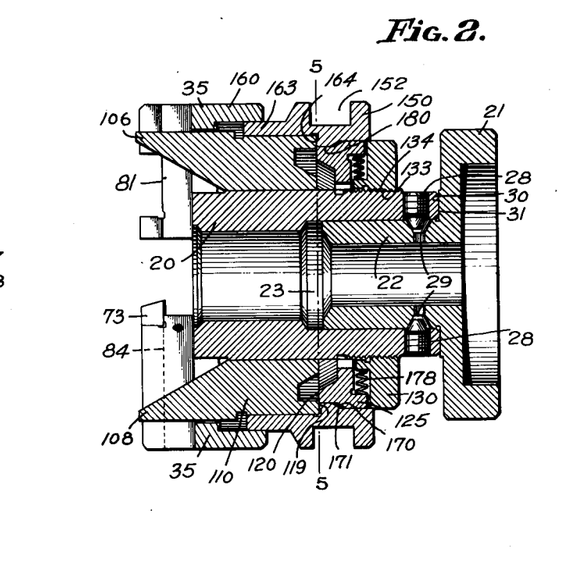
Fig. 2, a longitudinal section on the line 2—2 of Fig. 1 with the parts of the head in closed or thread cutting position.
Figure 3:
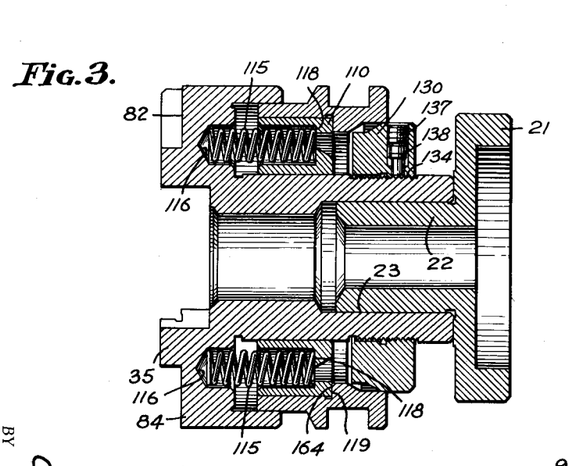
Fig. 3, a section on the line 3—3 of Fig. 1 illustrating the springs for opening the head at the termination of the thread cutting operation.
Figure 8:
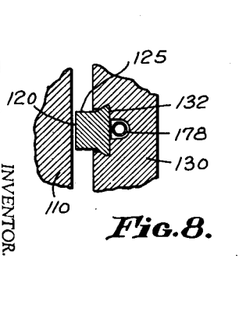
Fig. 8, a fragmentary detail on the line 8—8 of Fig. 6 showing details of the latch.

Referring particularly to Figs. 2, 3, and 4, springs 115 are disposed in bores 116 and 118 provided in the forward portion 35 of head body 20 and in closing ring 110. When the die head is in its closed or thread cutting position, end surface 119 of closing ring 110 is pressed against the bottom surfaces 120 of latch members 125 by the action of these springs. This spring force, in turn, is transmitted directly to combined locking and adjusting ring 130, each latch member 125 having a surface 132 bearing directly against the said ring 130 (see Figs. 4 and 8). Ring 130, in turn, transmits this force to the die head body 20, since this ring has thereon a threaded section 133 which coacts with threaded section 134 of die head body 20. A clamping plug 137 is threaded into ring 130 and abuts soft face piece 138 which coacts with threaded section 134 of head body 20 (see Fig. 3) to normally prevent ring 130 from turning with respect to head body 20. Thus, when the die head is in its thread cutting position, the closing ring 110 becomes, in effect, an integral part of the die head body 20 and thereby assures the production of accurate threads. This is true because the springs 115 are sufficiently strong to withstand any normal tendency to pull the closing ring 110 forwardly away from latch surfaces 120; therefore, the head experiences no inaccuracies due to clearance play between this ring and the head body.

The die head may readily be adjusted to size by loosening locking plug 137 and rotating the ring 130 with respect to the die head body 20. As the ring 130 is rotated, it also is axially displaced due to the coaction of threaded sections 133 and 134. This axial displacement causes the closing ring to assume a new position along the axis of the head body; therefore, the coacting chaser holders also assume a new radial position. It should be noted that the rotation of ring 130 also causes latch members 125, which are located therein, to rotate with respect to closing ring 110. Thus, latch surfaces 120 ride upon the full circumferential length of closing ring surface 119; and no localized wearing of this surface occurs. Ring surface 119 can readily be refinished; therefore, the die head can constantly be repaired to maintain its original thread cutting accuracy. After the desired diametrical setting or adjustment has been effected, clamping plug 137 can again be tightened to lock the ring 130 in its adjusted position.

Operating ring 150 is provided to trip or open the die head at the close of the thread cutting operation, said ring being actuated by a yoke (not shown) mounted on the threading machine (not shown) and engages in the recess 152 of the ring 150. The yoke serves to slide operating ring 150 along the axis of the die head. This yoke is normally stationary during the thread cutting operation; however, when it is desired to open or trip the die head, the yoke serves to move the operating ring rearwardly along the head axis.

Figs. 2 and 3 illustrate the arrangement of the various die head parts when the head is in its thread cutting position. The ring 150 is slidably mounted on the outer peripheral surface of closing ring 110 and on the corresponding surface of ring 130. The flange portion 160 of die head body forward portion 35 coacts with the forward portion 163 of operating ring 150 to form a dirt and chip seal. The yoke normally causes the counterbored surface 164 of ring 150 to bear against annular surface 119 of closing ring 110. Thus, as the die head is adjusted for size, the position of operating ring 150, with respect to rings 110 and 130, remains unchanged.

Figure 6:
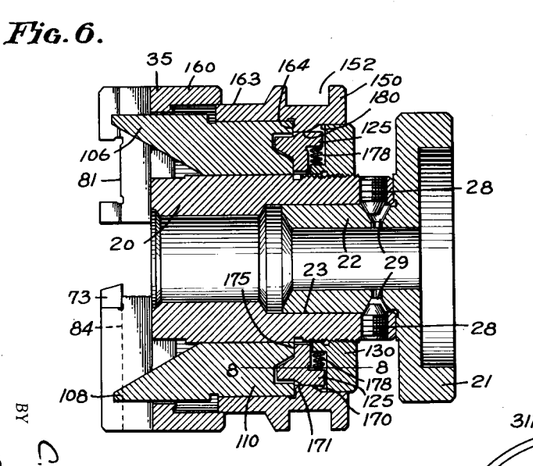
Fig. 6, a section similar to Fig. 2 but with the parts in open or non-thread cutting position.
Figure 7:
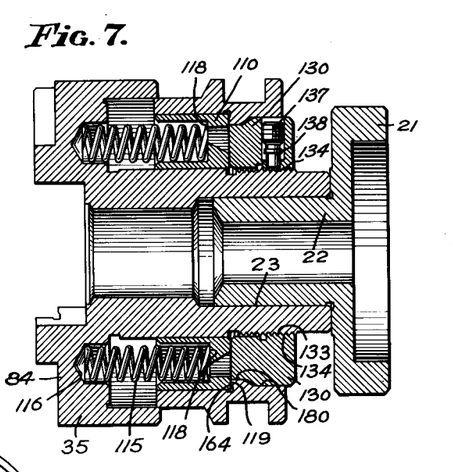
Fig. 7, a section similar to Fig. 3 but with the parts in open or non-thread cutting position.

After the desired length of thread has been cut, the operating ring 150 is moved rearwardly. This rearward movement of ring 150 causes the camming surface 171 thereof to come in contact with and to coact with the cam surfaces 170 of latch members 125. These latch members are then gradually and forcibly moved radially inward against the tension of springs 178 which serve to keep the said latch members in constant contact with the inner bore 180 of ring 150, until surfaces 120 thereof no longer are in contact with annular surface 119 of closing ring 110. When this occurs, the springs 115 force the closing ring 110 rearwardly until annular surface 119 thereof is in contact with latch member surfaces 175 (see Figs. 6 and 7). The die head is now in its tripped position since the rearward movement of the closing ring has caused the chaser holders to move radially outward and has thereby disengaged the chasers from the work.

Figure 11:
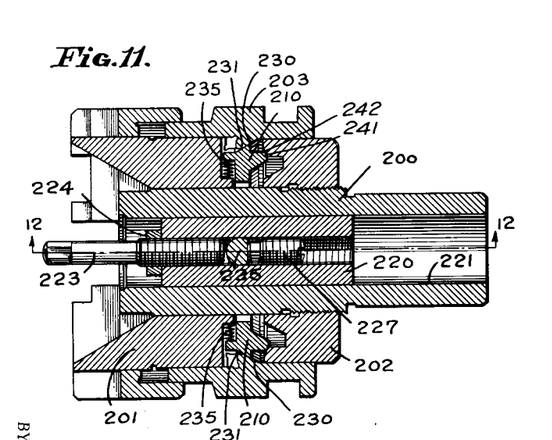
Fig. 11, a longitudinal section through a modified die head designed for cutting tapered threads.
Figure 12:
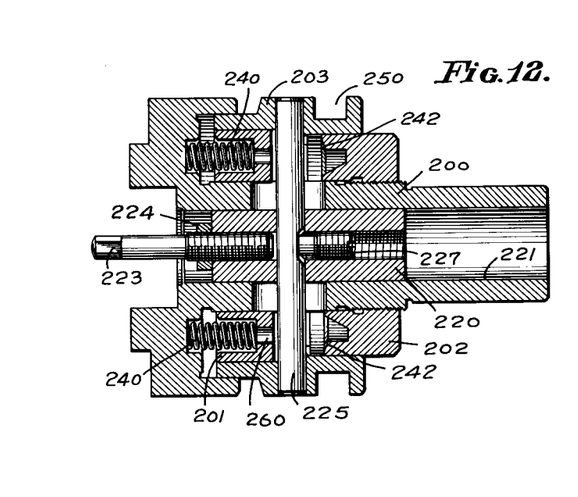
Fig. 12, a longitudinal section taken at right angles to Fig. 11 or in other words on the line 12—12 of Fig. 11.

Figs. 11 and 12 illustrate a modified type of die head adapted to cut tapered threads having a high degree of accuracy. In this modified die head, the latch members have camming and locking abutment surfaces which coact with cooperating surfaces located on the operating ring. Also, the latches are incorporated into the closing ring assembly and abut against the combined locking and adjustment ring, instead of being incorporated in this latter ring and abutting the closing ring. Further, this modified die head utilizes an internal trip mechanism which also is employed to actuate the operating ring and its associated receding train. The advantages of these details will presently be discussed.

This modified die head utilizes a head body 200, a closing ring 201, a combined locking and adjustment ring 202, and an operating ring 203 of the same general character as those similarly utilized in the die head first described. However, latch members 210 are now incorporated into the closing ring assembly. An internal trip plunger assembly 220 serves to actuate the operating ring to produce the receding of the chasers and to trip the die head. A yoke (not shown) may be employed to reset the die head after it has been tripped.

Internal trip plunger 220 is axially slidable within the bore 221 of head body 200 and has adjustably threaded in the front end thereof work-abutting rod member 223. A lock nut 224 is utilized to maintain the work abutting rod member in its adjusted position. A transverse pin 225 is passed through the plunger 220 and is locked thereto by dog screw 227, said pin forming a rigid connection between the plunger 220 and the operating ring 203.

The die is so designed that the first two or three threads are cut before the end of the work contacts the work abutting member 223, the tapering of the thread being assured by the use of chasers designed to cut tapered threads. Upon the engagement of the work and the abutting member 223, the die starts its receding motion to continue the cutting of the tapered thread, for when the contact occurs, the end of work abutting member 223 coacts with the work to move the plunger 220 rearwardly at the constant lead rate and, consequently, to move the operating ring 203 rearwardly at this rate, also. Operating ring 203 has camming surfaces 230 thereon which coact with similarly inclined surfaces 231 located on latch members 210. Thus, the forward movement of the work results in moving latch members 210 inwardly against the tension of latch springs 235 which serve to maintain the camming surfaces 230 and 231 in contact during the thread cutting operation.

Opening springs 240 constantly press against the closing ring 201 and tend to move it rearwardly; however, since surfaces 241 of latch members 210 normally abut coacting surfaces 242 located on the ring 202, the die head does not open until the operating ring has moved sufficiently rearward to force these surfaces to be disengaged. When this occurs, springs 240 force the closing ring 201 rearwardly and the chasers are released from the work in the same manner as has heretofore been described.

Figure 13:
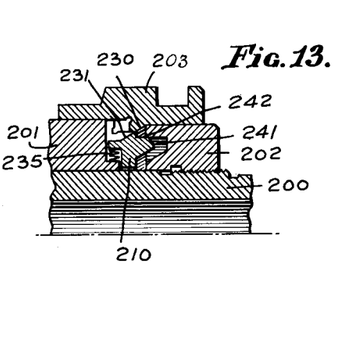
Fig. 13, a fragmentary section similar to that of Fig. 11 showing the position of the latching means at the instant of tripping.
Figure 14:
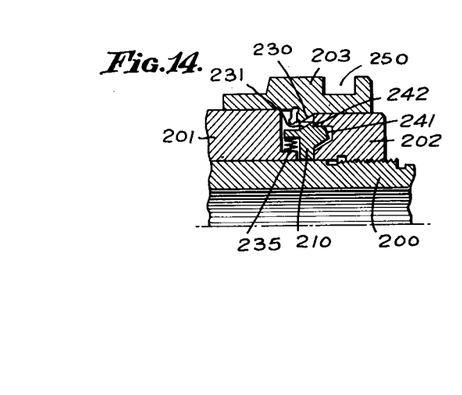
Fig. 14, a similar view showing the latching means in its tripped position.
Figures 15, 16:
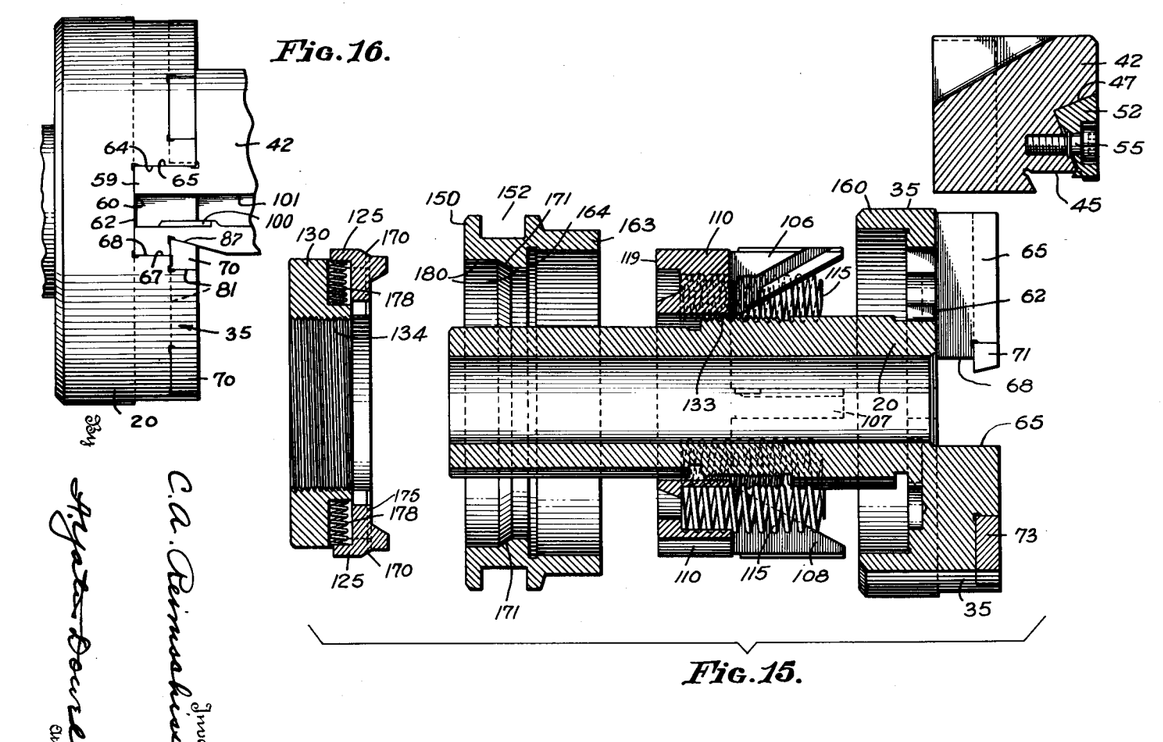

Fig. 13 shows the position of the various parts of the latching arrangement at the instant of tripping, while Fig. 14 similarly depicts their position after the head has been tripped.

It will be noted that the closing ring 201 and the combined ring 202 are utilized in substantially the same manner as like parts heretofore described; however, during the entire thread cutting operation, the closing ring is moving rearwardly at a rate which is controlled by the inclination of the camming surfaces 230 and 231 and the camming surfaces 241 and 242 and by the rate at which the chasers feed the work forward into the head. As stated above, these chasers (not shown) incorporate the correct taper therein; therefore, the receding action is merely employed to avoid the "digging in" action, which is inherent in tapered chasers as the thread cutting operation advances. Also, it is possible to cut tapered threads having a length greater than the width of the chaser, whereas this is not possible with die heads not incorporating a receding action since the thread length is limited to the width of the chaser used therein.

The die head is designed to be reset by a yoke mechanism (not shown) which cooperates with the recess 250 in ring 203. This arrangement may be similar to that previously described.

The closing ring 201 is provided with a plurality of holes 260 which permit the air in the void between the closing ring and the head body to escape as the die head is reset and which further eliminate any "sucking" action during the tripping operation. Thus, the operation of the camming train is not retarded by any pneumatic cushioning effect. It is not necessary to provide the closing ring 110 with special orifices since the spring sockets and groove in the ring communicate to provide the necessary escape. It should be noted that the inclination of camming surfaces 241 and 242 is so slight that springs 240 cannot trip the head of their own accord, especially since the latch member springs 235 resist any such premature tripping action.

Figure 9:
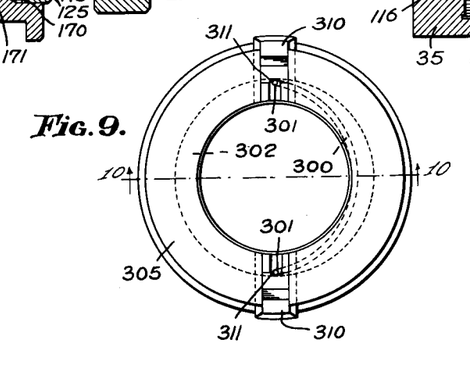
Fig. 9, a front elevation of the combined locking ring and adjusting nut employing a modified type of latching mechanism utilizing a single arcuate spring member instead of two coiled springs.
Figure 10:
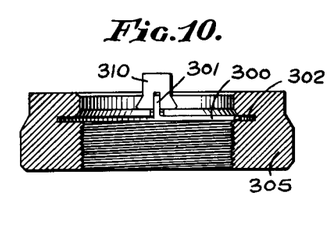
Fig. 10, a section at right angles to Fig. 9 to better show the spring construction and the slot in the ring in which it is located.

Figs. 9 and 10 illustrate a further modification which can be incorporated into either of the die heads heretofore described. In this instance a spring 300 is utilized to press the latch members radially outward. The spring 300 is positioned within the annular groove 302 of the combined ring 305 and has its free ends 301 pressing against end surfaces 311 of latch members 310 to force these members radially outward. The design of latch members 310 is similar to that of the previously described latch members. However, the use of this latter type of spring arrangement permits elimination of the integral latch lugs against which the coiled latch springs of the former designs abutted, involving less expense since the machining operation is simplified.

From the foregoing, it will be seen that the improved die head is relatively simple in construction, is unusually rigid and therefore highly precise in the threading operation, is well adapted for hand usage and may readily and economically be repaired. Further, means are provided whereby tapered threads of a high degree of accuracy may be produced.

The head may be utilized to cut in a full receding manner by having the work contact the abutting member at the same instant it contacts the chasers. A change in the proportions of some of the parts of the structure may be made to produce this desired effect although the design of the head structure is the same. This head is normally intended to be used with a lead screw to ensure that the threads will be free from a side shave. Obviously the use of a lead screw may be omitted when the bearing contact between the chasers and the cut thread is sufficient to draw the work into the die head without objectionable side shaving of the last few thread turns.

It will be understood that the foregoing and other advantages not stated are inherent in my improved die head; and that certain changes in construction and design are contemplated within the spirit and scope of the invention as defined by the appended claims.

What is claimed is:

1. A threading die comprising a body member having a flanged head provided with radial grooves and communicating axial slots, the bottoms of the grooves being parallel to the surface of the head and the sides of the grooves being at right angles thereto, tangential chasers, chaser holders having tongues in said grooves which tongues are provided with cooperating surfaces parallel to the surfaces of the grooves, said chaser holders having inclined cam surfaces, a closing ring having forwardly projecting cam elements extending through said slots and slidable on said inclined cam surfaces of said chaser holders, means on said cam elements cooperating with means on the chaser holders for causing the chaser holders to be moved positively by movement of the closing ring for opening and closing the die, springs between said closing ring and the flange on the head for urging the closing ring to move the tangential chasers and chaser holders to non-threading position, a combined locking and adjusting ring, an operating ring mounted on said closing and combined rings, and radial latching means between the operating ring and the combined ring, one of said rings having an annular bearing surface on which said latching means is adapted to ride, movement of the operating ring functioning to open and close the die.

2. In a threading device, threading means movable inwardly and outwardly into and out of engagement with work to be operated upon, an actuating member for moving said threading means, means for setting said threading means to cause the same to form threads of selective diameters, fully rotatable locking means bearing latching elements normally abutting said actuating member for securing said threading means in operative threading position, said means for setting said threading means being unitary with said locking means, and said locking means having means associated therewith coacting with said actuating member for releasing said threading means from the work.

3. In a threading device, threading means movable inwardly and outwardly into and out of engagement with work to be operated upon, an actuating member for moving said threading means, means for setting said threading means to cause the same to form threads of selective diameters, locking means for securing said threading means in operative threading position, said means for setting said threading means being a unitary structure with said locking means, and said locking means having latching means associated therewith coacting with said actuating member for releasing said threading means from the work.

4. In a threading device, threading means movable inwardly and outwardly into and out of engagement with work to be operated upon, an actuating member for moving said threading means, means for setting said threading means to cause the same to form threads of selective diameters, locking means for securing said threading means in operative threading position, said means for setting said threading means being unitary with said locking means, said locking means having latching means associated therewith coacting with said actuating member for releasing said threading means from the work, and resilient means maintaining said latching means in contact with said actuating member.

5. In a threading device, threading means movable inwardly and outwardly into and out of engagement with work to be operated upon, an actuating member for moving said threading means, means for setting said threading means to cause the same to form threads of selective diameters, locking means for securing said threading means in operative threading position, said means for setting said threading means being unitary with said locking means, said locking means having latching means associated therewith coacting with said actuating member for releasing said threading means from the work, and a pair of coil springs maintaining said latching means in contact with said actuating member.

6. In a threading device, threading means movable inwardly and outwardly into and out of engagement with work to be operated upon, an actuating member for moving said threading means, means for setting said threading means to cause the same to form threads of selective diameters, locking means for securing said threading means in operative threading position, said means for setting said threading means being unitary with said locking means, said locking means having latching means associated therewith coacting with said actuating member for releasing said threading means from the work, and a leaf spring maintaining said latching means in contact with said actuating member.

7. In a threading device, threading means movable inwardly and outwardly into and out of engagement with work to be operated upon, an actuating member for moving said threading means, means for setting said threading means to cause the same to form threads of selective diameters, locking means for securing said threading means in operative threading position, said means for setting said threading means being a unitary structure with said locking means, and said locking means having radially slidable latching means associated therewith coacting with said actuating member for releasing said threading means from the work.

8. In a threading device, threading means movable inwardly and outwardly into and out of engagement with work to be operated upon, an actuating member for moving said threading means, means for setting said threading means to cause the same to form threads of selective diameters, locking means for securing said threading means in operative threading position, said means for setting said threading means being unitary with said locking means, and said locking means having circumferentially spaced spring projected radially slidable latching means associated therewith coacting with said actuating member for releasing said threading means from the work.

9. In a head for mounting a thread-cutting tool a combined locking ring and adjusting ring forming a unitary structure for adjusting the relation of certain of the parts and for locking them in the desired adjusted position, said combined ring including latching means, and means providing an annular bearing for said latching means.

10. In a head for mounting a thread-cutting tool an operating ring and a combined adjusting and locking member forming a unitary structure associated with said ring for providing an adjustment to determine the functioning of the ring and for locking the parts in a definite relation until the ring is operated, said combined member including latching means for engagement with said operating ring, said operating ring being constructed to provide annular contact with said latching means.

11. In a threading device threading means movable inwardly and outwardly into and out of engagement with work to be operated upon, a closing ring provided with an annular contact surface, a combined locking and adjusting ring forming a unitary structure, and latches carried by said combined ring for continuous contact with said annular contact surface in any circumferential position of said latches.

12. In a threading device a body member, threading means carried by said body member and movable inwardly and outwardly into and out of engagement with work to be operated upon, a closing ring provided with an annular contact surface, a combined locking and adjusting ring, latches carried by said combined ring for continuous contact with said annular contact surface in any circumferential position of said latches, and resilient means between said body member and said closing ring for maintaining said latches against said annular contact surface.

13. In a threading die head; a plurality of chaser holders; tangential chasers mounted in said holders; a body member; a closing ring; an operating ring; and a locking ring having integral means to effect a diametrical setting of the die head; said locking ring having latch members coacting with said operating ring to open said die head.

14. In a threading die head; a plurality of chaser holders; tangential chasers mounted in said holders; a body member; a closing ring; an operating ring; and a locking ring having integral means to effect a diametrical setting of the die head; said locking ring having latch members coacting with said operating ring to open said die head; said locking ring further having resilient means coacting with said latch members to constantly keep them in contact with said operating ring.

15. In a threading die head; a plurality of chaser holders; tangential chasers mounted in said holders; a body member; a closing ring; an operating ring; and a locking ring having integral means to effect a diametrical setting of the die head; said locking ring having radially slidable latch members coacting with said operating ring to open said die head; said locking ring further having springs which coact with said latch members to constantly keep said members in contact with the inner periphery of said operating ring.

16. In a threading die head; a plurality of chaser holders; tangential chasers mounted in said holders; a body member; a closing ring; an operating ring; and a locking ring having integral means to effect a diametrical setting of the die head; said locking ring having radially slidable latch members coacting with said operating ring to open said die head; said closing ring having an annular surface in contact with surfaces on said latching members during the entire threading operation.

17. A die head comprising a body member, radially movable chaser holders carried by said body member, tangential chasers carried by said chaser holders, a closing ring, an operating ring, a fully rotatable locking ring having latch elements normally contacting an annular surface on said closing ring and further having means to effect a diametrical setting of the die head assembly integral therewith, camming means, and a work abutting member coacting with said camming means for producing a tapered thread.

18. A die head comprising a body member, radially movable chaser holders carried by said body member, tangential chasers carried by said chaser holders, a closing ring for moving the chaser holders and chasers carried thereby for opening and closing the die head, an operating ring, a combined locking and adjusting ring forming a unitary structure, means providing a receding train for producing tapered threads, and means for operating said train including a trip plunger associated with said operating ring and a work abutting member associated with said plunger.

19. A die head comprising a body member, radially movable chaser holders carried by said body member, tangential chasers carried by said chaser holders, a closing ring for moving the chaser holders and chasers carried thereby for opening and closing the die head, an operating ring, a combined locking and adjusting ring, means providing a receding train for producing tapered threads, and means for operating said train including a trip plunger associated with said operating ring and a work abutting member associated with said plunger, said receding train being adapted to be operated after cutting of the first few threads on the work.

20. A die head comprising a body member, radially movable chaser holders carried by the body member, tangential chasers carried by said chaser holders, a closing ring for moving the chaser holders and chasers carried thereby for opening and closing the die head, means for securing said chaser holders and chasers in operative threading position, means for causing recession of the threading means after the first few threads are cut in a normal manner, said chasers being utilized to motivate the die head for tripping and opening the same.

21. In a head for mounting a thread-cutting tool capable of variable diametrical setting, a body member, a closing ring, an operating ring, and a locking ring having integral therewith means to effect a diametrical setting of the head, said locking ring having latch members associated therewith and coacting with said operating ring to open said head, said locking ring further having resilient means coacting with said latch members to constantly keep them in contact with said operating ring.

22. In a head for mounting a thread-cutting tool capable of variable diametrical setting, a body member, a closing ring, an operating ring, and a locking ring having integral therewith means to effect a diametrical setting of the head, said locking ring of said assembly having radially slidable latch members coacting with said operating ring to open said head, said locking ring further having springs which coact with said latch members to constantly keep said members in contact with the inner periphery of said operating ring.

23. In a head for mounting a thread-cutting tool capable of variable diametrical setting, a body member, a closing ring, an operating ring, and a locking ring having integral therewith means to effect a diametrical setting of the head, said locking ring having radially slidable latch members coacting with said operating ring to open said head, said closing ring having an annular surface thereon in contact with surfaces on said latching members during the entire productive operation.

24. In a head for mounting a thread-cutting tool capable of variable diametrical setting, a body member, a closing ring, an operating ring, and a locking ring having integral therewith means to effect a diametrical setting of the head, said locking ring having radially slidable latch members coacting with said operating ring to open said head; said closing ring having an annular surface thereon in contact with surfaces on said latching members during the entire productive operation; said head also incorporating resilient means between said body member and said closing ring.

CHARLES A. REIMSCHISSEL.